US011442931B2

(12) United States Patent
Virtuoso et al.

(10) Patent No.: US 11,442,931 B2
(45) Date of Patent: Sep. 13, 2022

(54) ENABLING FEDERATED QUERY ACCESS TO HETEROGENEOUS DATA SOURCES

(71) Applicant: Amazon Technologies, Inc., Seattle, WA (US)

(72) Inventors: Anthony A. Virtuoso, Hawthorne, NJ (US); Rahul Pathak, Mercer Island, WA (US); Mehul Shah, Redmond, WA (US); Akila Tennakoon, Brooklyn, NY (US); Jian Fang, Issaquah, WA (US); Seth Thomas Denney, New York, NY (US); Jason Denton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 16/585,680

(22) Filed: Sep. 27, 2019

(65) Prior Publication Data

US 2021/0097067 A1    Apr. 1, 2021

(51) Int. Cl.
*G06F 16/242* (2019.01)
*G06F 16/2455* (2019.01)
*G06F 16/248* (2019.01)

(52) U.S. Cl.
CPC ........ *G06F 16/2423* (2019.01); *G06F 16/248* (2019.01); *G06F 16/2455* (2019.01)

(58) Field of Classification Search
CPC . G06F 16/2423; G06F 16/2455; G06F 16/248
USPC ........................................................ 707/769
See application file for complete search history.

(56) References Cited

U.S. PATENT DOCUMENTS

2018/0089312 A1* 3/2018 Pal .................... G06F 16/26
2021/0064618 A1* 3/2021 Liu .................. G06F 16/24524

FOREIGN PATENT DOCUMENTS

WO      2018/045185 A1    3/2018

OTHER PUBLICATIONS

International Search Report and Written Opinion, PCT App. No. PCT/US2020/052018, dated Dec. 3, 2020, 10 pages.
Martinez et al., "The QOL approach for optimizing distributed queries without complete knowledge", IDEAS'12, ACM, Aug. 8-10, 2012, pp. 91-99.

* cited by examiner

*Primary Examiner* — Joshua Bullock
(74) *Attorney, Agent, or Firm* — Nicholson De Vos Webster & Elliott LLP

(57) ABSTRACT

Techniques are described for an interactive query service that enables users to query data stored at a federated collection of data sources. An interactive query service provides interfaces that enable users to configure the interactive query service to query any number of heterogeneous data sources pertinent to a user. In general, the configuration of a data source can include identification of: a data source type, access configurations related to accessing the data source, and in some cases metadata describing a structure of the data stored by the data source (for example, a data catalog describing schemas, tables, columns, partitions, datatypes, or other metadata associated with the stored data). Once configured, an interactive query service can receive and execute queries that involve data stored at any combination of a user's data sources, where the queries may be expressed using a standard query language such as the Structured Query Language (SQL).

20 Claims, 8 Drawing Sheets

ENABLING FEDERATED QUERY ACCESS TO HETEROGENEOUS DATA SOURCES

BACKGROUND

Relational databases, which model data as rows and columns in a series of tables, have long been a popular form of data organization and storage. However, service provider networks and other applications have made it increasingly easy for developers to use a wide variety of other types of data stores across their software applications and systems. Examples of such alternative data store types include object storage services (which can store files of virtually any file type and format), non-relational databases, data warehouses, and the like. While relational databases can provide optimal storage and querying performance in some contexts, the characteristics of other such data stores can improve scalability and performance for other use cases. The ability to readily integrate different types of data stores into software applications and systems has led to an increasing use of multiple types of data stores depending on the particular performance, durability and availability, scalability, security, and other considerations related to each subset of data to be stored and used by an application.

BRIEF DESCRIPTION OF DRAWINGS

Various embodiments in accordance with the present disclosure will be described with reference to the drawings, in which.

DETAILED DESCRIPTION

Figure 1:
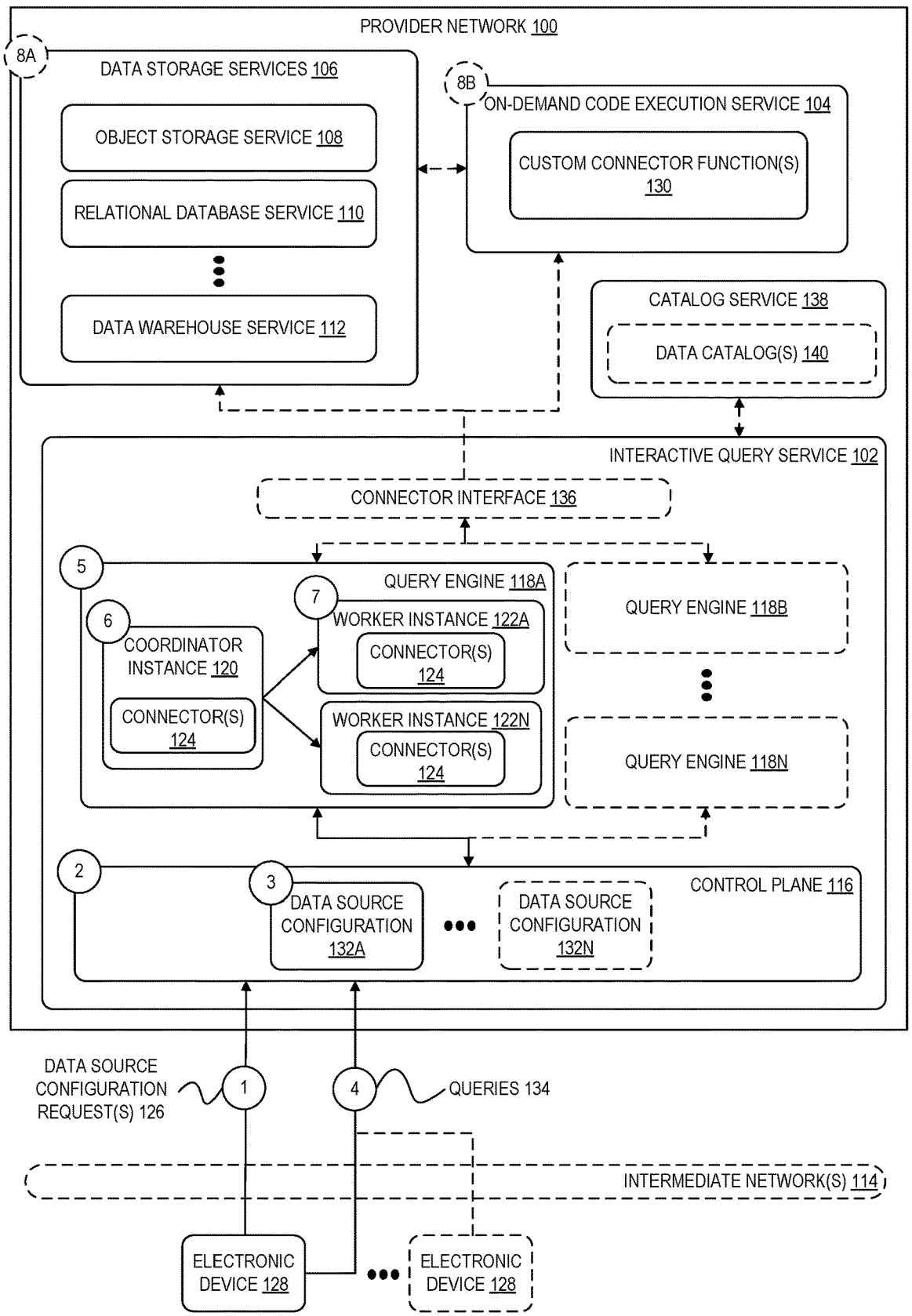
FIG. 1 is a diagram illustrating an environment including an interactive query service that enables users to query data stored at a federated collection of data sources according to some embodiments.

The present disclosure relates to methods, apparatus, systems, and non-transitory computer-readable storage media for an interactive query service that enables users to query data stored at a federated collection of data sources. According to some embodiments, an interactive query service provides interfaces that enable users to configure the interactive query service to access and query any number of heterogeneous data sources storing data pertinent to the user.

In general, the configuration of a data source can include identification of: a data source type (for example, object storage provided by an object storage service of the provider network, a database instance provided by a database service of the provider network, data accessible from an external service via an application programming interface (API), or any other type of data source), access configurations related to accessing the data source (for example, a uniform resource locator (URL) used to access the storage resource, a connection string used to access a database instance, rate limiting configurations, and so forth), and in some cases an indication of how to retrieve metadata describing a structure of the data stored by the data source (for example, an API endpoint or other interface used to retrieve a data catalog describing schemas, tables, columns, partitions, datatypes, or other metadata associated with the stored data). Once configured, an interactive query service can receive and execute queries that involve data stored at any combination of a user's data sources, where the queries may be expressed using a standard query language such as the Structured Query Language (SQL) or other query language. In this manner, users can easily gain powerful insights derived from data stored across any number of separate data sources without the need to perform cumbersome extract, transform, and load (ETL) operations or other processes to first consolidate data for querying.

Many types of software-based applications and systems rely on the storage of data in various types of data stores such as databases, files, and the like. When developing such applications, developers often strive to use a type of data store that is best suited for the user's particular data and the general problem at hand. For example, a developer might determine that one type of data store is best suited for the storage of log data generated by an application, while another type of data store is better suited for the storage of application and user settings, and so forth. Service provider networks have enabled developers to more easily develop, deploy, and scale such applications and to use a wide variety of data stores. A provider network, for example, might provide each of an object storage service, a relational database service, a data warehousing service, an archival storage service, among other types of storage-related services. Developers can easily integrate these various types of storage services into their applications as desired, in addition to the use of other data sources located on-premises or elsewhere.

While ready access to different types of data stores and storage services enables developers to use data stores best suited for each of their various data storage needs, the development of applications in this fashion often leads to data fragmentation. For example, if an application developer desires to analyze some aspect of their customers' use of an application, the data needed to answer that question might be spread across any number of separate data sources (for example, including user profile data managed by a database instance, log data stored at a separate data warehousing service, configuration data stored at yet another separate object storage service, and so forth). It is often challenging in these scenarios and others to obtain a holistic view of the data environment and to efficiently obtain answers to interesting data-driven questions. Some users may resort to exporting data from each of their various data sources into a single data source and attempt to analyze the manually consolidated dataset. This process however often hinders users' ability to perform data analyses on-demand and may also introduce data quality and consistency issues as a result of cumbersome data export and consolidation processes.

In some embodiments, to enable users to easily query various types of data and data formats stored at an object storage service, a provider network includes an interactive query service. An interactive query service enables the analysis of such data using a standard querying language, such as SQL, by allowing users to identify the data's storage location, define a schema for the data, and run queries on the data based on the defined schema. In some embodiments, such an interactive query service is "serverless" from the user's perspective, meaning the hardware used to implement the service is primarily managed by the provider network and a user can use the service without awareness of the underlying hardware and other components used to run the queries and perform other actions. Users can access the interactive query service via various interfaces such as, for example, a web-based console, an API provided by the interactive query service, or a CLI interface. Using these interfaces, a user can perform various actions including creating or selecting databases; creating, viewing, and deleting tables representing the user's data; filtering tables; previewing tables; showing table properties; running queries on tables, saving and formatting queries, and viewing query history; displaying, saving, and exporting query results, and so forth.

An interactive query service as described above enables users to query virtually any type of data and data format stored in an object storage service. For at least the reasons identified above, however, users may also desire to query data stored not only in an object storage service but in other types of data storage such as databases provided by a database service, data stores provided by other types of storage services, on-premises storage resources, data accessible from external services via APIs, data stored in a cache, and the like. According to embodiments described herein, an interactive query service further enables users to configure any such type of data store as a data source that a user can query using the interactive query service. In this manner, users can easily and efficiently query data stored across any number of separate, or federated, data sources stored using any number of different types of data storage.

FIG. 1 is a diagram illustrating an environment including an interactive query service that enables users to query data stored at a federated collection of data sources according to some embodiments. In some embodiments, an interactive query service 102, an on-demand code execution service 104, and other data storage services 106 (including, for example, an object storage service 108, a relational database service 110, and a data warehouse service 112), among any number of other possible services, operate as part of a service provider network 100. Each service comprises one or more software modules executed by one or more electronic devices at one or more data centers and geographic locations. User(s) using one or more electronic device(s) 128 (which may be part of or separate from the service provider network 100) can interact with the various services of the service provider network 100 via one or more networks 114, such as the internet. Although embodiments described herein refer to the ability for external "customers" of a provider network to customize provider network APIs, in general, the techniques described herein can be used by any user desiring to modify or extend the operation of one or more actions associated with an API of a provider network 100.

A provider network 100 (or "cloud" provider network) provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 114 (for example, the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (for example, the internet, a cellular communication network) and the hardware and software in cloud provider data centers that provide those services.

A cloud provider network can be formed as a number of regions, where a region may be a geographical area in which the cloud provider clusters data centers. Each region can include multiple (for example, two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (for example, the internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (for example, resource placement, hardware capacity management, diagnostic monitoring, system state information). The data plane includes customer resources that are implemented on the provider network (for example, computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks. The example shown in FIG. 1 illustrates, for example, a control plane 116 of the interactive query service 102, the operation of which is described in more detail elsewhere herein.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (for example, provided by a hardware virtualization service) hosted by the provider network to perform a variety of computing tasks. Additionally, or alternatively, a user may indirectly utilize a compute instance by submitting code to be executed by the provider network (for example, via an on-demand code execution service), which in turn utilizes a compute instance to execute the code—typically without the user having any control of or knowledge of the underlying compute instance (s) involved.

For example, in various embodiments, a "serverless" function may include code provided by a user or other entity—such as the provider network itself—that can be executed on demand. Serverless functions may be maintained within provider network 100 by an on-demand code execution service 104 and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (for example, having a pre-initialized runtime environment configured to execute the serverless functions), allowing the serverless functions to be executed in near real-time.

In some embodiments, a provider network 100 includes an interactive query service 102. At a high level, to use an interactive query service 102, a user first creates a database and at least one table representing data the user desires to query. A table can be created, for example, to refer to data stored in a data storage service of the provider network or elsewhere. In some embodiments, the interactive query service 102 includes one or more query engines 118A-118N that are architected in a way to interface with various data sources hosted at locations other than the interactive query service 102.

Traditionally, database engines are implemented using tightly coupled architectures, where a database engine determines how data is stored and is further associated with a proprietary data storage format. Such database engines typically maintain a catalog that describes how the data is stored, for example, as a collection of tables, columns, and data types. These database engines further include a query engine that is configured to query the data using the catalog and knowledge of the proprietary data storage format. In contrast, an interactive query service 102 as described herein separates the storage, catalog metadata, and compute functions of a database engine into independently configurable components. In this manner, users can query any data source by configuring the interactive query service 102 to access the data source and optionally defining a schema for data stored at the data source. For example, if a user's data source is a storage location provided by an object storage service 108 that includes one or more CSV files, the user can provide configuration data indicating how to connect to the storage location and further identifying a location of metadata (for example, contained in a JSON file or XML file) describing a structure of the data stored in the files. Using this configuration data, an interactive query service 102 can execute queries against the data stored at the identified storage location.

In some embodiments, an interactive query service 102 is implemented using a distributed system running on a cluster of servers. As shown in FIG. 1, to execute queries and perform other operations, such a cluster can include a coordinator instance 120 that manages the operation of any number worker instances 122A-122N. At a high level, a query received from a client computing device is initially received by the control plane 116 and forwarded to a coordinator instance 120. In some embodiments, the coordinator instance 120 then parses the query, analyzes and plans the execution of the query, and distributes the work to carry out a query execution plan to one or more worker instances 122A-122N.

In some embodiments, each data source with which the interactive query service 102 is able to interface is associated with a corresponding "connector." A connector broadly represents executable code or other logic that enables the interactive query service 102 to interface with one or more particular types of data sources. Regardless of a data source's type of data storage, a connector can be used to access a data source assuming the connector implements certain functions expected by the interactive query service 102 for accessing a data source (for example, functions related to managing metadata, providing schema and table information, identifying parts of a table to be read as part of scan/project/filter tasks, splitting the data into partitions, and so forth). In some embodiments, a connector provides additional information about a data source such as capability information related to an amount of supported parallelism, a number of supported connections, and the like. As described in more detail elsewhere herein, a coordinator instance 120 and the worker instances managed by a coordinator instance 120 are each configured with one or more connectors 124 upon launch in order to access the data sources relevant to a query being executed. In some embodiments, an interactive query service 102 implements a connector interface 136 layer that enables any query engine 118A-118N to communicate with any connector 124 and, by extension, with any configured data source. As one example, a connector interface 136 may be implemented at least in part based on a cross-language development platform for in-memory data, such as the Apache® Arrow® platform or the like.

As indicated above, developers of modern software applications and systems are often faced with the problem of data fragmentation. According to embodiments described herein, the ability to manage and query a federated collection of data sources is exposed to customers and other external users of a provider network 100 via an interactive query service 102 in part to alleviate the challenges of such data fragmentation (and to generally enable the ability to query any type of data). The numbered circles labeled "1" through "8" in FIG. 1 illustrate an example process involving an external customer of a service provider network 100 configuring one or more data sources to be queried using the interactive query service 102 and sending queries involving data stored at the configured data sources for execution by the interactive query service 102 according to some embodiments. In some embodiments, at the circle labeled "1" in FIG. 1, a customer or other user of the provider network 100 generates one or more data source configuration requests 126, where the request(s) may originate from a computing device 128 external to the provider network 100. A user can generate the data source configuration requests 126, for example, by using API calls, via console implemented as a website or application, or the like. For example, a user may desire to configure a data source to be able to query data the user has caused to be stored at an object storage service 108, a relational database service 110, a data warehouse service 112, or any other data source.

In some embodiments, the configuration of a data source generally includes providing input indicating a type of the data source, specifying access configurations used to access the data source, and, optionally, identifying metadata that describes a structure of the data stored at the data source, among other possible data source-specific options. For example, assume a user is configuring the interactive query service 102 to access a database instance maintained by a relational database service 110. In this example, the data source configuration request(s) 126 may identify that the data source is a relational database, further specify a connection string used to connect to the database, a username and password used to authenticate with the database, other networking properties of the connection to the database, in addition to possibly other relevant configurations. For some types of data sources, such as a relational database, metadata describing the structure of the data is maintained by the data source itself (such as a data catalog maintained by a relational database instance). For other types of data sources, a user can separately identify a location of a data catalog or other metadata describing a structure of the data (for example, in a metadata store). As shown in FIG. 1, for example, a user may specify the location of one or more data catalogs 140 managed by a separate catalog service 138, managed by another service of the provider network 100, managed by a service external to the provider network 100, or a data catalog can be provided by a user to the interactive query service 102.

In some embodiments, the configuration of a data source can include specifying rate limiting configurations or other settings related to defining a number of requests that can be received by the data source per unit of time. Referring again to the example above of configuring a data source corresponding to a relational database, for example, a user may specify a maximum throughput for the connection (for example, to avoid queries originating from the interactive query service 102 overloading the database instance and possibly preventing other clients from reading the same data). In some embodiments, this rate limiting information can be expressed as a maximum number of input/output operations per second (IOPs) that the interactive query service 102 can use when accessing the data source, a percentage of the data source's total read capacity (either across all tables, on a per table basis, on a per query basis, or the like), or based on any other rate limiting mechanism supported by the data source. In addition the rate limiting configurations provided at configuration time, an interactive query service 102 applies rate limiting controls at query execution time depending on a current state of a data source being queried (for example, to throttle operations at a data source if it is determined that the data source is currently under heavy usage).

In some embodiments, an interactive query service 102 internally implements connectors to many different types of data sources, such as data sources provided by various data storage services 106, that can be used by users of the service. Users can also create custom connectors to other data sources that may not be explicitly supported by the interactive query service 102. For example, in some embodiments, users can use an on-demand code execution service 104 to create custom connector functions 130 to access and perform other operations relative to data stored at virtually any data source accessible via a network. The interactive query service 102 can then interface with these custom connector functions 130 via an on-demand code execution service 104 connector implemented by the interactive query service 102 that is designed to communicate with such functions. In this manner, users can execute queries involving data spread across any number of data storage service 106, proprietary data stores, and more. Additional detail related to custom connector functions is described elsewhere herein. In some embodiments, custom connector functions 130 can also be used to enrich or supplement data stored at a data source. For example, if an interactive query service 102 is used to query data stored at an object storage service 108, a user may create a custom connector function 130 to perform a lookup on a field in data accessed by the interactive query service 102 (for example, to convert a field containing IP addresses into domain names, to add user profile information based on a field containing a username, or the like)

In an embodiment, at circle "2" in FIG. 1, a control plane 116 of the interactive query service 102 receives and processes the data source configuration request(s) 126 and, at circle "3," creates data source configuration data and stores the configuration data in association with a user account. As shown in FIG. 1, any number of data source configurations 132A-132N may be created and stored depending on a number of separate data sources configured by a user. The data source configurations 132A-132N may be logically separated in some examples or, in other examples, stored as part of a same configuration for a particular user or set of users.

Once a user has configured one or more data sources using the interactive query service 102, as described above, the user can run queries against data stored in those data sources. Returning to FIG. 1, at circle "4," a user causes an electronic device 128 to send one or more queries 134 involving some or all of the user's configured data sources. In other examples, a query can be included as part of an API request generated programmatically by an application running inside or outside of the provider network 100. For example, the queries can originate from sources other than an external electronic device 128 including from compute instances of a hardware virtualization service, from other services of the provider network 100, or from other devices outside of the provider network 100.

As an example, consider a query that involves a join operation between first data stored at an object storage service 108 and second data stored at a relational database service 110. In this example, the query submitted by the user references at least one table stored at the object storage service 108 (for example, "oss.table1") and at least one table stored at the relational database service 110 (for example, "rds.table2"), although the underlying type of data storage for the two tables may be considerably different. The identities of the tables and associated columns referenced in the query, for example, may be specified in metadata identified by the user as part of the data source configuration process or in metadata maintained by the data sources. In some embodiments, the control plane 116 of the interactive query service 102 receives the query and, at circle "5," forwards the query to a query engine 118A, which is responsible for coordinating the execution of the query. In some embodiments, the selection of one or more query engines 118A-118N to execute the query may depend on the data sources involved in the query and possibly other configurations that a user associated with the query has specified. For example, a user may provide input specifying a preference of a query engine to be used to query certain data sources, certain types of queries, or based on other preferences.

In some embodiments, at circle "6," a coordinator instance 120 of the query engine 118A analyzes the query and identifies the data sources involved (in the example above, a storage location at the object storage service 108 and a relational database at the relational database service 110). The control plane 116 further provides to the coordinator instance 120 data source configurations for the data sources involved in the query (for example, one or more of data source configuration 132A-132N corresponding to the relevant data sources).

In some embodiments, at circle "7," the coordinator instance 120 uses the data source configuration(s) to determine an appropriate amount of resources to be used to execute the query and launches a corresponding number of worker instances 122A-122N. The launching of the worker instances 122A-122N includes configuring the instances with the appropriate connector(s) 124 so that the worker instances can communicate with the data source(s) relevant to the query. As illustrated in the example of FIG. 1, in some embodiments, the configuration of the worker instances 122A and corresponding connector(s) 124 occurs at query execution time. In this manner, the interactive query service 102 can perform queries on newly added data sources "on the fly" and without the user having to reconfigure the operation of the query engines. In other embodiments, one or more worker instances may be preconfigured to communicate with certain types of data sources.

In some embodiments, a query engine 118A is now able to communicate with the one or more data sources involved in the query and the engine determines an amount of work expected to execute the query. For example, a query engine 118A may create one or more query plans for the query and determine an estimated cost of executing each of the respective plans. In some embodiments, an expected amount for work to execute a query can be used to determine an amount of hardware to dedicate to execution of the query (for example, a number and type of worker nodes to launch as part of the processes described above). A number of worker instances to dedicate to each of the data sources may depend on, for example, the types of operations to be performed to execute the query, the amount of data to be accessed to perform the operations, the respective scaling capabilities of the corresponding data sources to parallelize certain types of operations, and so forth.

In some embodiments, an interactive query service 102 processes a query in part by identifying a user account associated with the query and associated user permissions relative to the various data sources involved in the query. The user permission information can be retrieved and used by a query engine executing the query, by the respective data sources at which data is retrieved, by the data catalog, or combinations of these services, to determine whether the user requesting execution of the query has sufficient permissions to access the particular data items involved in the query. If a user tries to access data to which the user does not have sufficient permissions, the interactive query service 102 may return an error message to the user, mask the data to which the user has insufficient permissions, or perform other actions.

Figure 2:
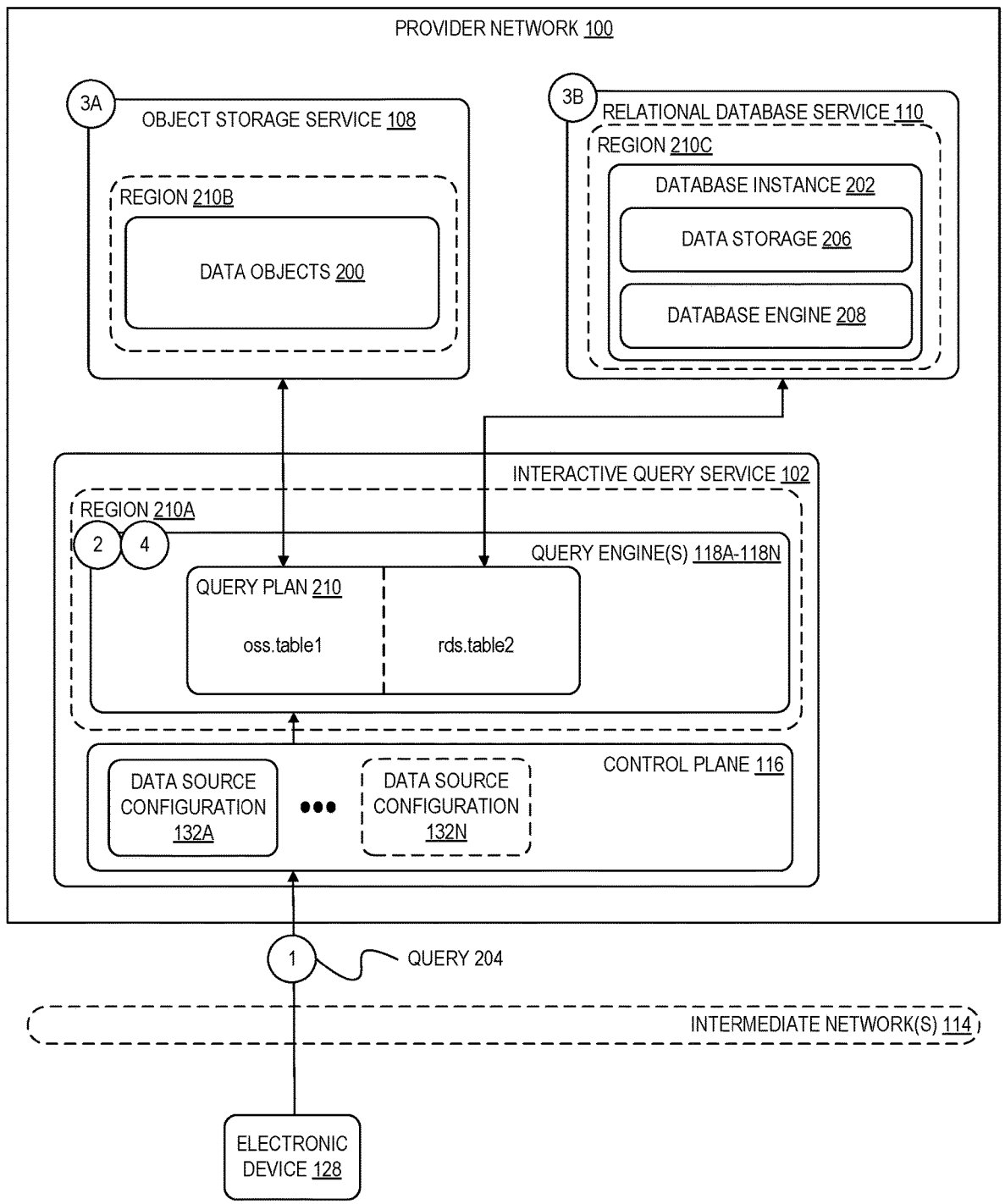
FIG. 2 is a diagram illustrating the federation of a query to multiple different types of data sources according to some embodiments.

As an example, consider again a query that involves accessing first data managed by an object storage service 108 and second data managed by a relational database service 110. FIG. 2 illustrates an interactive query service 102 executing a query involving data stored at a federated collection of data sources, including data objects 200 stored at an object storage service 108 and a database instance 202 provided by a relational database service 110. In the example of FIG. 2, at circle "1," a user submits a query 204 that involves data stored as part of the data objects 200 and as part of the data storage 206 of the database instance 202. Further assume in this example that the database engine 208 has been optimized with indexes related to the data to be queried from the database instance 202.

In this example, at circle "2," a query engine 118A generates a query plan 210 that involves obtaining data from both the object storage service 108 and the relational database service 110. In this example, the query to be executed further involves filtering the data from the data objects 200 and the data stored at data storage 206. As part of generating the query plan 210, the query engine 118A determines that the query engine is to filter the data obtained from the object storage service 108 (for example, because the data is not indexed at the object storage service 108). In this example, the query engine 118A further obtains a query plan from the database engine 208 to perform the portion of the query relevant to the database instance 202, where the query plan indicates an expected amount of work to execute the portion of the query. As indicated above, the database engine 208 has a stored index related to the data in data storage 206 and thus can perform the operation efficiently; the query engine 118A thus delegates the filtering of the data stored at data storage 206 to the database engine 208.

As indicated above, the query engine 118A in FIG. 2 executes the query plan 210 by obtaining the data from the object storage service 108 at circle "3A" and obtains the data from the relational database service 110 at circle "3B" (where the query engine further delegates the filtering operations to the database engine 208). In some embodiments, at circle "4," the query engine 118A then filters the data obtained from the object storage service 108, performs the join operation further using the filtered data obtained from the relational database service 110, and returns the results to the requesting client device.

As indicated above, in some embodiments, the interactive query service 102 in some cases delegates the compute resources used to process portions of a query to other engines. An interactive query service may interface with any number of different query engines, data source connectors, and data sources depending on various characteristics of each in terms of capabilities and optimizations. For example, to execute a particular query, an interactive query service 102 may use an internal query engine and particular connectors for some parts of a query plan involving certain data sources, while using other data source-specific query engines or other tools to perform other operations involved in the query. In some embodiments, the partial query results obtained from each of these federated sources can then be joined, aggregated, or otherwise combined by the interactive query service 102 to obtain the desired query results.

In the example shown in FIG. 2, further assume that the object storage service 108 supports a high degree of parallelism and that launching more worker instances generally increases throughput, while the relational database service 110 supports only a limited number of connections (but may be able to parallelize some query operations internally). A query engine 118A may then further determine a number of worker instances to be used to perform joins, aggregations, and other operations once data is obtained from the data sources. In general, a query engine 118A can scale a number of worker nodes to be used to execute a query depending on the capabilities of each data source. In some embodiments, information about the capabilities of a data source are communicated to a query engine of an interactive query service by a connector for the data source. For example, as part of the query planning processes performed by a coordinator instance, the instance can obtain from the connectors information indicating an amount of work that is expected to be able to carry out a respective operation as well as how much parallelism or throughput is supported by the data source to carry out the operation. In this manner, a cost-based optimizer of the coordinator instance can better determine an optimal execution plan based on the respective characteristics of each data source.

As shown in FIG. 2, in some embodiments, the data sources queried by an interactive query service 102 may reside in one or more defined regions of the provider network 100 that are different from a region in which the interactive query service 102 resides. For example, while some or all of the compute resources and other components of the interactive query service 102 may be associated with a region 210A, a user's data objects 200 may be stored by an object storage service 108 on resources residing in a different region 210B, while the same user's database instance 202 may operate on resources residing in yet another region 210C. In general, an interactive query service 102 can be configured to access data sources residing in a same region or across any number of separate regions of a provider network 100.

As indicated above, in some cases, an interactive query service 102 may delegate the execution of portions of a query to one or more of the data sources involved in the query. In some embodiments, as part of the query planning process, an interactive query service 102 may determine that multiple access mechanisms exist for a particular data source and choose among the multiple access mechanisms for accessing the data. For example, if a query involves accessing and filtering data stored by a database instance managed by a database service of the provider network 100, an interactive query service 102 may determine that a plurality of access mechanisms exist for obtaining the relevant data: using a connector to read the data via the database service and perform the filtering at the interactive query engine, delegating the read and filtering to a database engine at the database service, directly accessing the data storage to perform the read and filtering, among other possible access mechanisms. In this example, the interactive query service 102 may analyze each of the possible access mechanism and select a particular access mechanism based at least in part on a type of operation to be performed and capability information associated with the relevant data source (for example, whether the operation is a filter, join, or other operation and the data source's capability for performing such operations), and use the selected access mechanism to execute at least a portion of the query.

Figure 3:
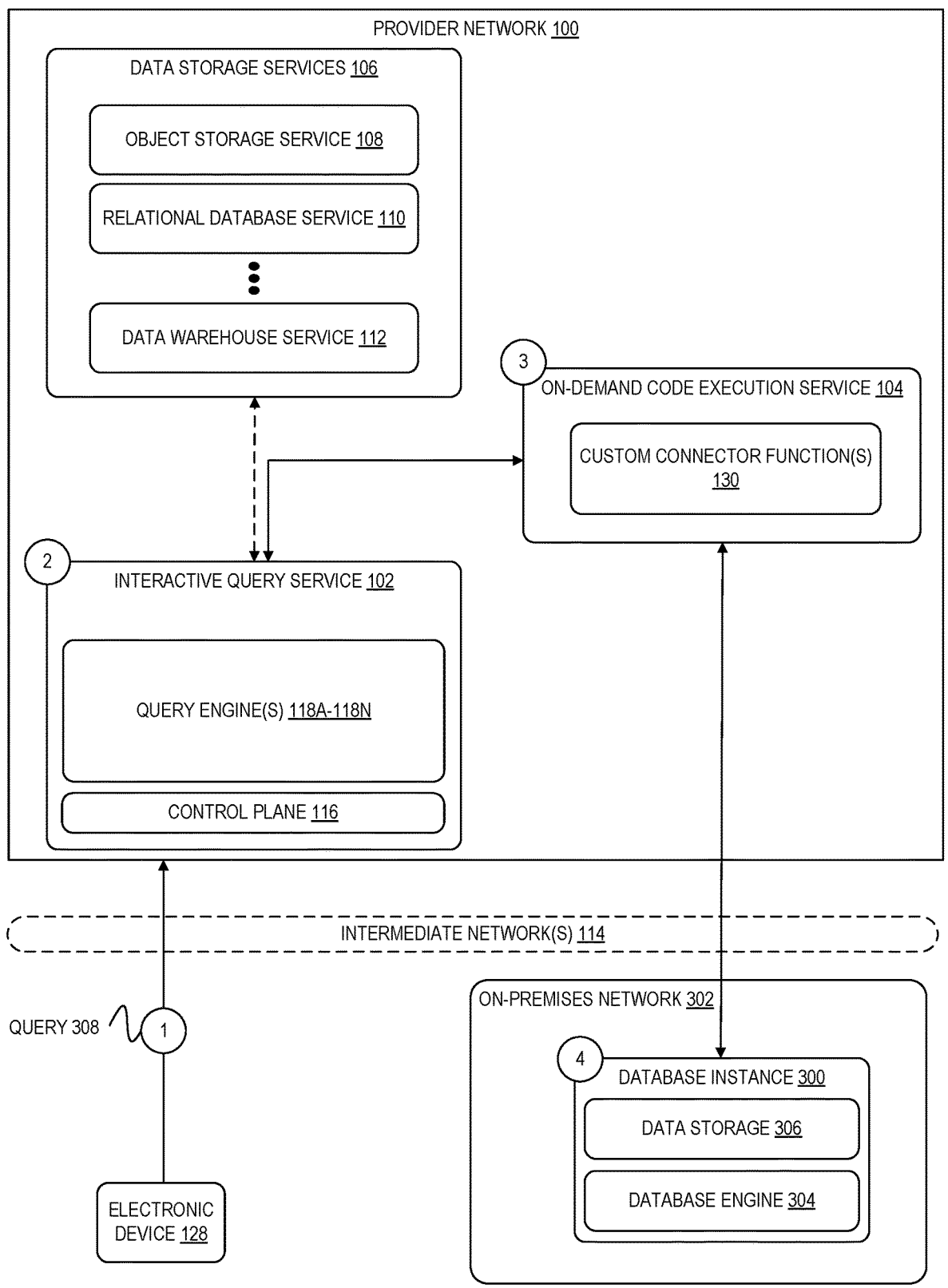
FIG. 3 is a diagram illustrating an interactive query service querying an on-premises data source via a custom connector managed by an on-demand code execution service according to some embodiments.

As indicated above, in some embodiments, an interactive query service 102 enables users to query data stored in data sources across different services of a provider network 100 as well as data sources located outside of the provider network 100, for example, at on-premises resources or at external services. FIG. 3 illustrates an example of using an interactive query service 102 to execute queries involving data stored in one or more on-premises data sources according to some embodiments. In the example shown in FIG. 3, a user of the interactive query service 102 has created one or more custom connector function(s) 130 that implement various operations used to access data stored by a database instance 300 hosted within an on-premises network 302. In some embodiments, a user can implement separate custom connector functions for the following operations and possibly others: managing metadata, generating splits of the data, and performing various table scan activities. The user may then configure the interactive query service 102 to communicate with the custom connector function(s) 130 (for example, via an on-demand execution service connector implemented by the interactive query service 102) such that the on-premises database instance 300 is configured as an accessible data source. As shown, the on-premises database instance 300 includes its own database engine 304 and data storage 306. In some embodiments, the custom connector function(s) 130 further implement network configurations used to access the on-premises data source via one or more intermediate network(s) 114.

In some embodiments, at circle "1" in FIG. 3, a query 308 is received by the control plane 116 of the interactive query service 102. In some embodiments, at circle "2," the interactive query service 102 obtains basic table and schema information related to the query from a corresponding custom connector function 130. A coordinator instance of a query engine 118A-118N similarly obtains schema, data type information, and table layout information (for example, partitions) and optionally performs initial partition pruning operations. In some embodiments, the coordinator instance further calls a split handler function of the custom connector functions 130 providing a set of partitions and receives information back indicating how to read the data in those partitions. In some embodiments, worker nodes managed by the coordinator instance then call a record handler function of the custom connector function 130 to read the data from the data source via the custom connector functions.

As illustrated by this example, the ability to create custom connector functions 130 enables users to extend the functionality of the interactive query service 102. The custom connector functions 130 can be used, for example, to access data stored in any type of data source, including data sources for which the interactive query service 102 provides native connectors. For example, a user might create a custom connector function 130 to read data stored by an object storage service 108 in a manner that is not currently implemented by the interactive query service's own connector to the object storage service 108. In other examples, a custom connector function can be created to support a proprietary data store or data format stored at provider network service or elsewhere, including data accessible via APIs of other services.

Figure 4:
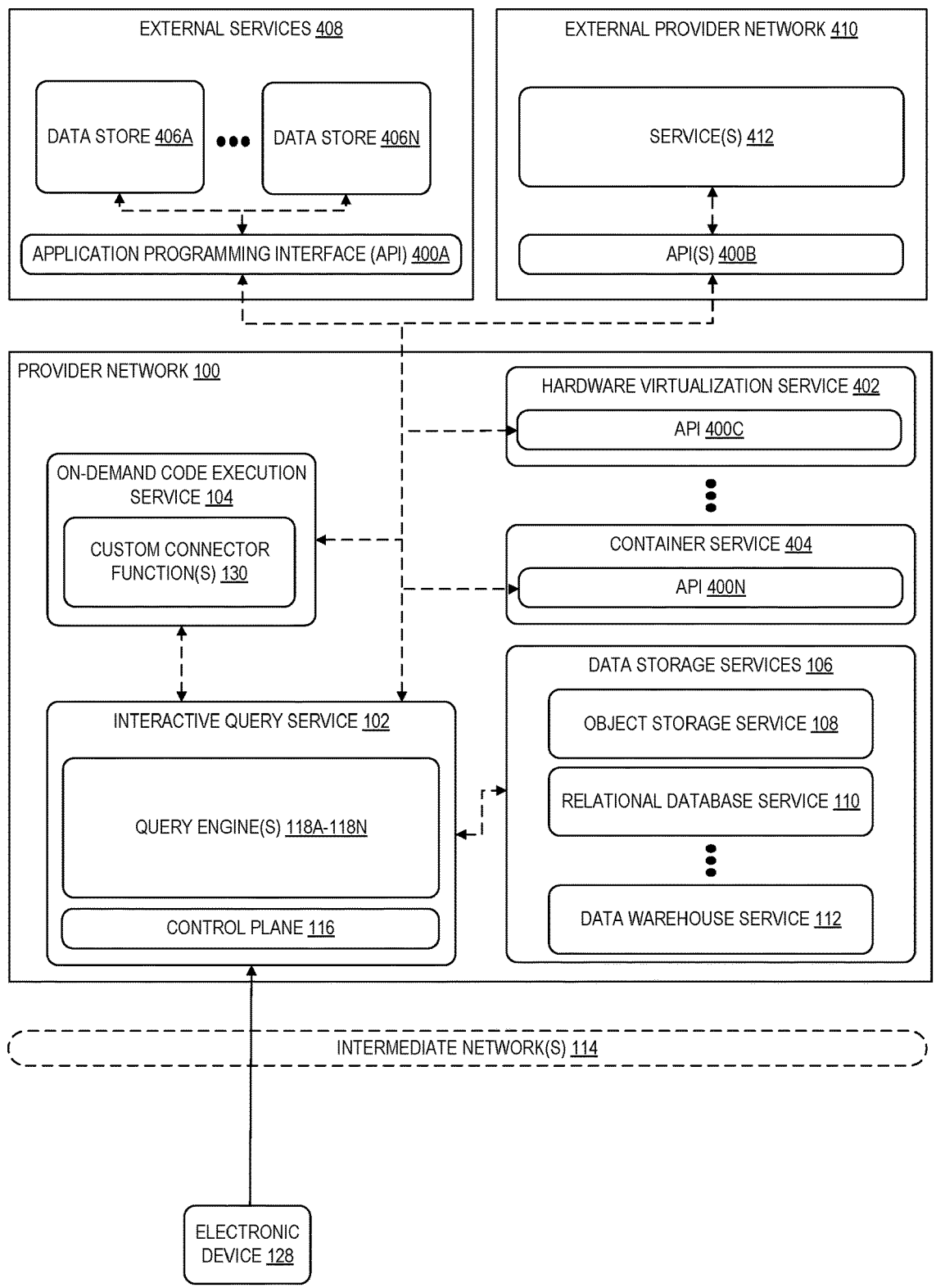
FIG. 4 is a diagram illustrating an interactive query service querying an application programming interface (API) as part of a federated query according to some embodiments.

FIG. 4 is a diagram illustrating an interactive query service querying various APIs as part of a federated query according to some embodiments. In some embodiments, an interactive query service 102, for example, can query data accessible via any API assuming a user identifies metadata describing a structure of the data (for example, a structure represented by tables, columns, fields, data types, etc.). In some embodiments, the APIs 400A-400N that can be accessed by an interactive query service 102 include APIs associated with external services 408 (such as customer relationship management (CRM) applications and services, team collaboration software, external data analysis tools, and the like). In some embodiments, the APIs further include API(s) 400B which may be associated with various services 412 of other provider networks 410, as well as provider network services APIs such as APIs 400C-400N. In this manner, a user can query for information related to resources managed by various types of provider network services (for example, to obtain information about VM instances managed by a hardware virtualization service 402 or containers managed by a container service 404. Similarly, a user can query any number of data stores 406A-406N accessible via an API 400A of an external service. As indicated above, a schema describing the structure of the data accessible via an API may be specified as part of the data source configuration by identifying a location of metadata describing the data structure. In some embodiments, access to data accessible via an API can be implemented by one or more custom connector function(s) 130 such that a user can use the interactive query service 102 to access any API as desired.

Figure 5:
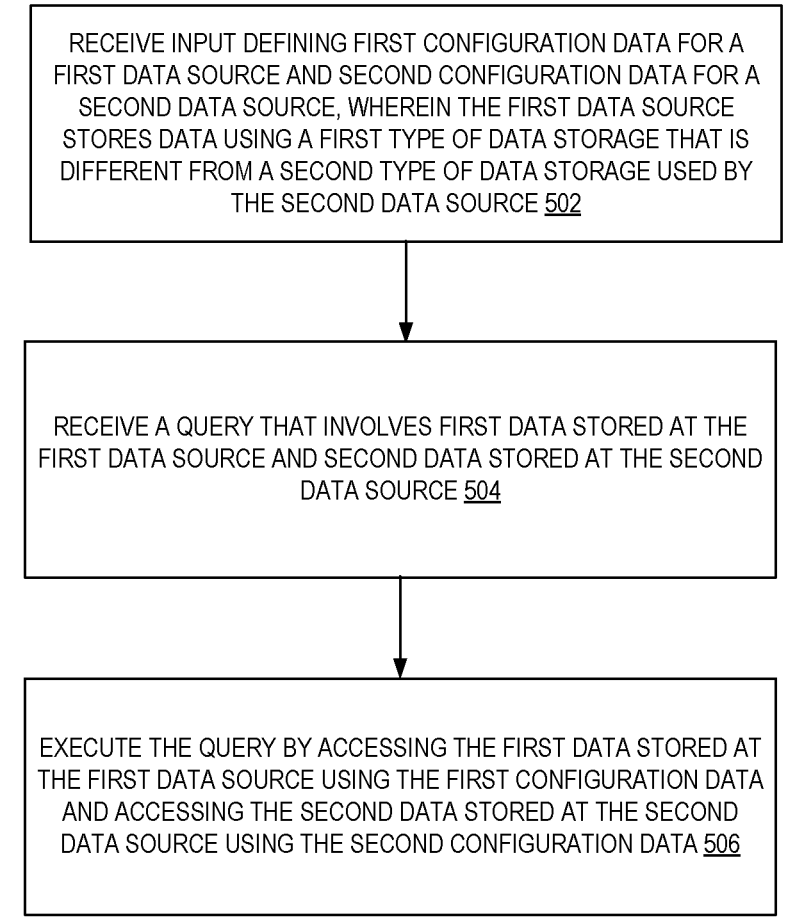
FIG. 5 is a flow diagram illustrating operations of a method for an interactive query service that enables users to query data stored at a federated collection of data sources according to some embodiments.

FIG. 5 is a flow diagram illustrating operations 500 of a method for an interactive query service that enables users to query data stored at a federated collection of data sources according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an interactive query service 102 of the other figures.

The operations 500 include, at block 502, receiving input defining first configuration data for a first data source and second configuration data for a second data source, wherein the first data source stores data uses a first type of data storage that is different from a second type of data storage used by the second data source. In some embodiments, the first data source includes one of: object storage provided by an object storage service of the service provider network, a database instance provided by a database service of the service provider network, a data warehouse provided by a data warehouse service of the service provider network, data accessed via an application programming interface (API) of the service provider network, data accessed via an API of a service external to the service provider network, or data stored at an on-premises storage location external to the service provider network.

In some embodiments, the first configuration data indicates a type of the first data source and further includes at least one first access configuration for accessing the first data source. In some embodiments, the first configuration data includes identification of metadata describing a structure of the first data, the metadata identifying at least one of: a schema of the first data, a table, columns of the table, or datatypes contained in the first data. In some embodiments, the first configuration data includes a rate limiting configuration, and wherein the interactive query service accesses the first data source according to the rate limiting configuration.

In some embodiments, the first configuration data identifies at least one user-created function managed by an on-demand code execution service of the service provider network, and wherein executing the query includes invoking execution of the at least one user-created function to access the first data stored at the first data source.

The operations 500 further include, at block 504, receiving a query that involves first data stored at the first data source and second data stored at the second data source. In some embodiments, the query is a Structured Query Language (SQL) query, and the interactive query service translates at least a first portion of the SQL query into first operations used to access the first data source and at least a second portion of the SQL query into second operations used to access the second data source.

The operations 500 further include, at block 506, executing the query by accessing the first data stored at the first data source using the first configuration data and accessing the second data stored at the second data source using the second configuration data. In some embodiments, the interactive query service executes the query using a query engine that accesses the first data source using a connector that implements functionality for reading data from the first data source. In some embodiments, the connector provides the interactive query service with capability information related to the first data source.

In some embodiments, the operations further include identifying a portion of the query to be executed to obtain the first data; obtaining a query plan from the first data source for executing the portion of the query, the query plan generated by a query engine of the first data source and indicating an expected amount of work to execute the portion of the query; determining, based on the query plan and the expected amount of work, to use the query engine of the first data source to execute the portion of the query; and causing the first data source to execute the portion of the query.

In some embodiments, the first data source includes data provided a service and accessible via an application programming interface (API), wherein the first configuration data includes a data catalog describing a structure of the data accessible via the API, and wherein executing the query includes sending at least one API request to the service to access the first data.

In some embodiments, the operations further include determining that the first data is accessible via a plurality of access mechanisms; selecting a particular access mechanism of the plurality of access mechanisms based at least in part on a type of operation to be performed on the first data and capability information associated with the first data source; executing at least a portion of the query using the particular access mechanism.

Figure 6:
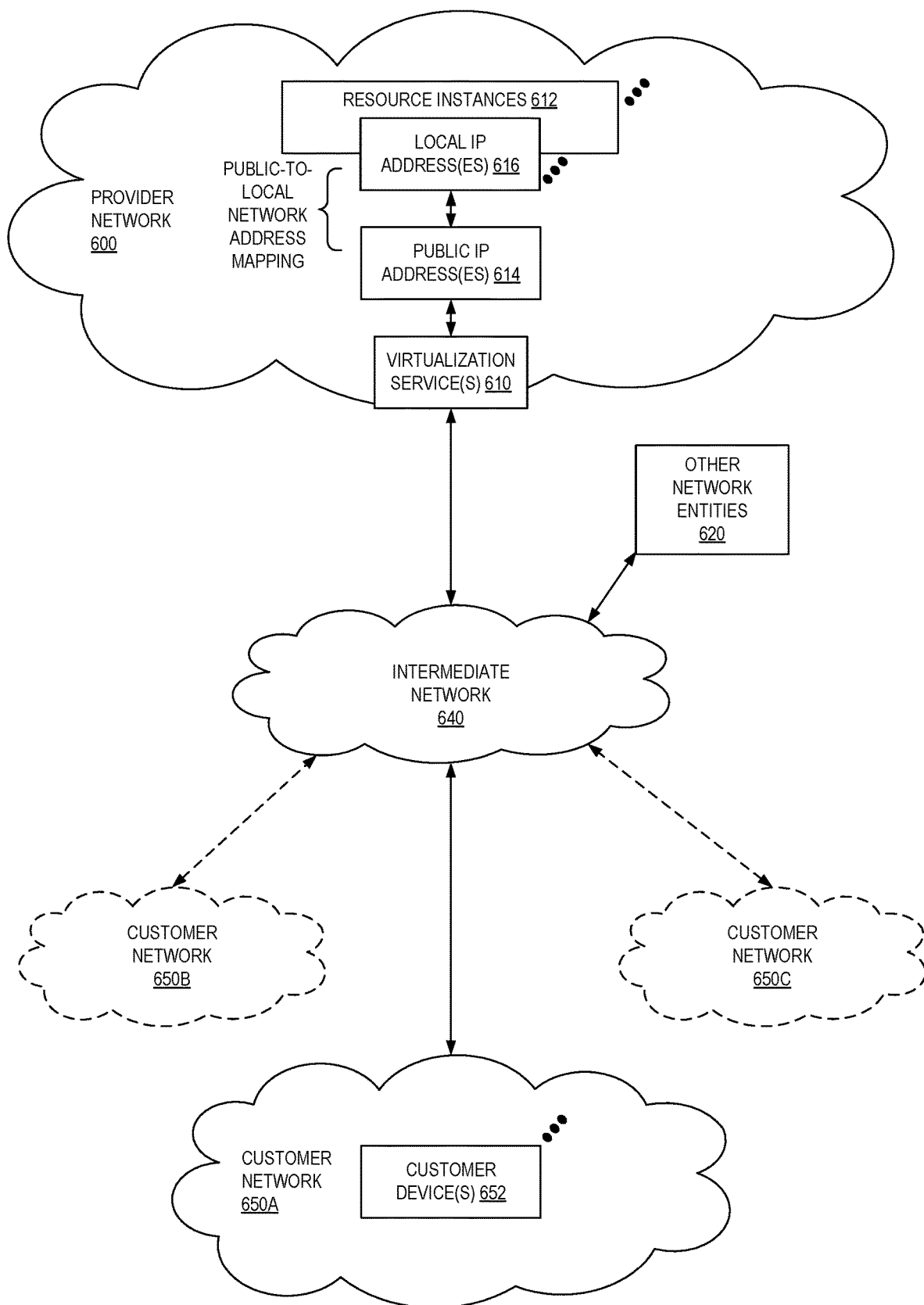
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider network 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
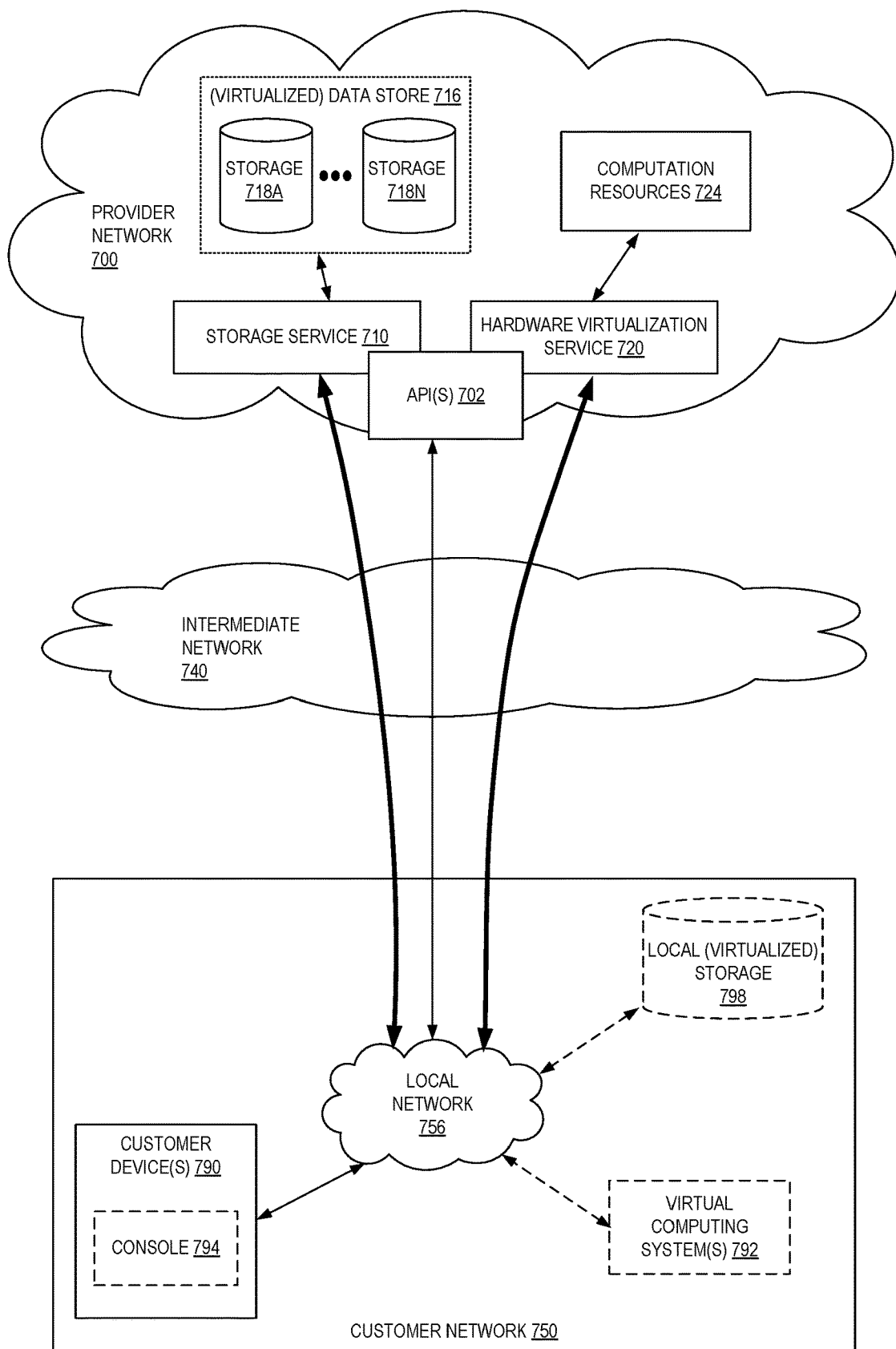
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
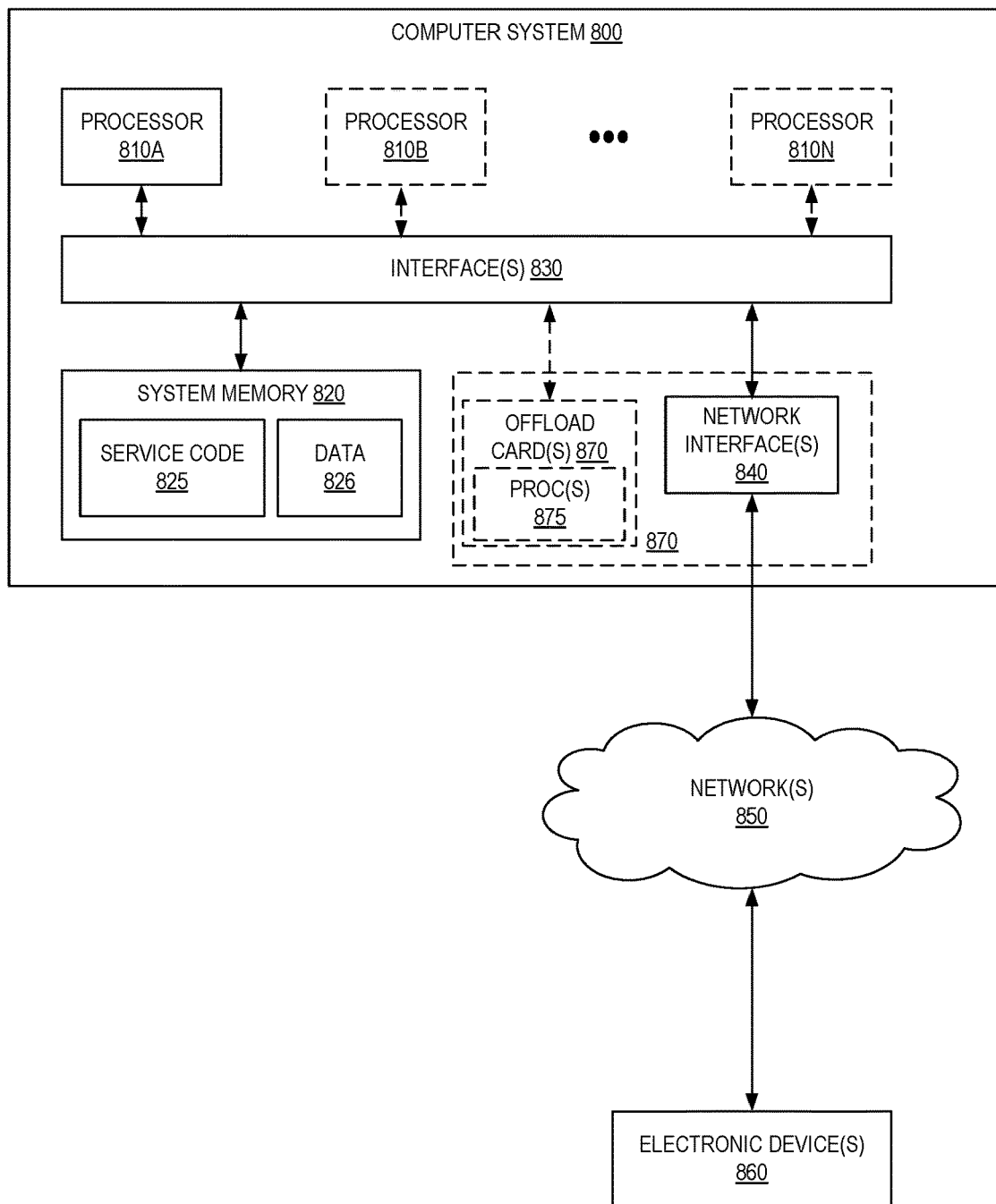
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by an interactive query service of a service provider network, the method comprising:
    receiving, from a user of the interactive query service, input via an interface of the interactive query service, the input defining:
        first configuration data for a first data source, the first configuration data indicating a first type of the first data source, including one or more of object storage, a database instance, a data warehouse, or data accessible from an external service, and further including at least first access configuration for accessing the first data source, and
        second configuration data for a second data source, the second configuration data indicating a second type of the second data source, including one or more of object storage, a database instance, a data warehouse, or data accessible from an external service, and further including at least one second access configuration for accessing the second data source, wherein the first data source stores data using a first type of data storage that is different from a second type of data storage used by the second data source;
    receiving a query that references first data stored at the first data source and second data stored at the second data source;
    translating at least a first portion of the query into first operations used to access the first data source and at least a second portion of the query into second operations used to access the second data source; and
    executing the query by accessing the first data stored at the first data source using the first configuration data and the first operations and accessing the second data stored at the second data source using the second configuration data and the second operations.

2. The computer-implemented method of claim 1, wherein the first data source includes at least one of: object storage provided by an object storage service of the service provider network, a database instance provided by a database service of the service provider network, a data warehouse provided by a data warehouse service of the service provider network, data accessed via an application programming interface (API) of the service provider network, data accessed via an API of a service external to the service provider network, data stored in a data cache, data stored in a first region that is different from a second region in which the interactive query service operates, or data stored at an on-premises storage location external to the service provider network.

3. The computer-implemented method of claim 1, wherein the first configuration data identifies at least one user-created function managed by an on-demand code execution service of the service provider network, and wherein executing the query includes invoking execution of the at least one user-created function to access the first data stored at the first data source.

4. A computer-implemented method performed by an interactive query service, the method comprising:
    receiving input defining first configuration data for a first data source and second configuration data for a second data source, wherein the first data source uses a first type of data storage that is different from a second type of data storage used by the second data source, and wherein the first and second types of data storage include one or more of object storage, a database instance, a data warehouse, or data accessible from an external service;
    receiving a query that references first data stored at the first data source and second data stored at the second data source;
    translating at least a first portion of the query into first operations used to access the first data source and at least a second portion of the query into second operations used to access the second data source; and
    executing the query by accessing the first data stored at the first data source using the first configuration data and the first operations and accessing the second data stored at the second data source using the second configuration data and the second operations.

5. The computer-implemented method of claim 4, wherein the first data source includes at least one of: object storage provided by an object storage service of a service provider network, a database instance provided by a database service of the service provider network, a data warehouse provided by a data warehouse service of the service provider network, data accessed via an application programming interface (API) of the service provider network, data accessed via an API of a service external to the service provider network, data stored in a data cache, data stored in a first region that is different from a second region in which the interactive query service operates, or data stored at an on-premises storage location external to the service provider network.

6. The computer-implemented method of claim 4, wherein the first configuration data identifies at least one user-created function managed by an on-demand code execution service of a service provider network, and wherein executing the query includes invoking execution of the at least one user-created function to access the first data stored at the first data source.

7. The computer-implemented method of claim 4, further comprising:
identifying a portion of the query to be executed to obtain the first data;
obtaining a query plan from the first data source for executing the portion of the query, the query plan generated by a query engine of the first data source and indicating an expected amount of work to execute the portion of the query;
determining, based on the query plan and the expected amount of work, to use the query engine of the first data source to execute the portion of the query; and
causing the first data source to execute the portion of the query.

8. The computer-implemented method of claim 4, wherein the first configuration data indicates a type of the first data source and further includes at least one first access configuration for accessing the first data source.

9. The computer-implemented method of claim 4, wherein the first configuration data indicates how metadata describing a structure of the first data is to be retrieved, the metadata identifying at least one of: a schema of the first data, a table, columns of the table, or datatypes contained in the first data.

10. The computer-implemented method of claim 4, wherein the first configuration data includes a rate limiting configuration, and wherein the interactive query service accesses the first data source according to the rate limiting configuration.

11. The computer-implemented method of claim 4, wherein the first data source includes data provided a service and accessible via an application programming interface (API), wherein the first configuration data includes a data catalog describing a structure of the data accessible via the API, and wherein executing the query includes sending at least one API request to the service to access the first data.

12. The computer-implemented method of claim 4, wherein the interactive query service executes the query using a query engine that accesses the first data source using a connector that implements functionality for reading data from the first data source.

13. The computer-implemented method of claim 4, further comprising:
determining that the first data is accessible via a plurality of access mechanisms;
selecting a particular access mechanism of the plurality of access mechanisms based at least in part on a type of operation to be performed on the first data and capability information associated with the first data source; and
executing at least a portion of the query using the particular access mechanism.

14. The computer-implemented method of claim 4, wherein the interactive query service executes the query using a query engine that accesses the first data source using a connector that implements functionality for reading data from the first data source, and wherein the connector provides the interactive query service with capability information related to the first data source.

15. The computer-implemented method of claim 4, wherein the query is a Structured Query Language (SQL) query.

16. A system comprising:
an interactive query service of a service provider network implemented by a first one or more electronic devices, the interactive query service including instructions that upon execution cause the interactive query service to:
receive input defining first configuration data for a first data source and second configuration data for a second data source, wherein the first data source stores data using a first type of data storage that is different from a second type of data storage used by the second data source, wherein the first type of data storage of the first data source is one of object storage, a data warehouse, or data accessible from an external service, and wherein the second data source is provided by a database service of the service provider network,
receive a query that references first data stored at the first data source and second data stored at the second data source,
translate at least a first portion of the query into first operations used to access the first data source and at least a second portion of the query into second operations used to access the second data source,
generate a query plan based at least in part on the query, the first configuration data, and the second configuration data, and
execute the query plan at least in part by sending a portion of the query plan to the database service; and
the database service of the service provider network implemented by a second one or more electronic devices, the database service including instructions that upon execution cause the database service to:
receive the portion of the query plan from the interactive query service,
execute the portion of the query plan using a query engine of the database service to obtain partial query results, and
send the partial query results to the interactive query service.

17. The system of claim 16, wherein the first data source includes one of: object storage provided by an object storage service of the service provider network, a database instance provided by a database service of the service provider network, a data warehouse provided by a data warehouse service of the service provider network, data accessed via an application programming interface (API) of the service provider network, data accessed via an API of a service external to the service provider network, or data stored at an on-premises storage location external to the service provider network.

18. The system of claim 16, wherein the first configuration data indicates a type of the first data source and further includes at least one first access configuration for accessing the first data source.

19. The system of claim 16, wherein the first configuration data includes identification of metadata describing a structure of the first data, the metadata identifying at least one of: a schema of the first data, a table, columns of the table, or datatypes contained in the first data.

20. The system of claim 16, wherein the first configuration data includes a rate limiting configuration, and wherein the interactive query service accesses the first data source according to the rate limiting configuration.

\* \* \* \* \*